United States Patent [19]
Labrador

[11] Patent Number: 5,507,943
[45] Date of Patent: Apr. 16, 1996

[54] WATER-WAVE ENERGY CONVERTER SYSTEMS

[76] Inventor: Gaudencio A. Labrador, 1312 Leaf Ter., San Diego, Calif. 92114

[21] Appl. No.: 811,470

[22] Filed: Dec. 18, 1991

Related U.S. Application Data

[63] Continuation-in-part of Ser. No. 255,657, Oct. 13, 1988, Pat. No. 5,056,447, Ser. No. 472,753, Jan. 31, 1990, Pat. No. 5,027,735, Ser. No. 376,002, Aug. 15, 1989, Pat. No. 5,094,595, and Ser. No. 820,082, Jan. 21, 1986, Pat. No. 5,052,902, which is a continuation-in-part of Ser. No. 631,322, Jul. 19, 1984, abandoned.

[51] Int. Cl.$^6$ ................................................ B01D 61/10
[52] U.S. Cl. ........................... 210/136; 210/170; 210/259; 210/321.87
[58] Field of Search .................... 210/170, 259, 210/652, 136, 321.87; 417/332, 330; 114/256; 159/11.2; 126/426; 405/76, 75, 23, 204, 205, 217

[56] References Cited

U.S. PATENT DOCUMENTS

| | | | |
|---|---|---|---|
| 4,118,941 | 10/1978 | Bruce et al. | 405/204 |
| 4,540,313 | 9/1985 | Broóme | 405/75 X |
| 4,993,348 | 2/1991 | Wald | 114/256 X |

*Primary Examiner*—Frank Spear

[57] ABSTRACT

What is created is a multichambered honeycomb structure; made of laminates and composite materials to cut cost and provide strength and durability; disposed floating on open waters in an elongated form to serve as sea wall to break up the surfs to create a calm harbor for safe refuge for boats, floating houses, fishermen and protection of the shoreline; having an impact wall with window one-way valves to convert the energy of the surfs into elevated water that drive a water turbine, or into compressed air that drive a gas turbine electric generator; having a rectangular floater oscillator that activates a rocker arm drive bar by the energy of the water waves; having an under water deep well reverse osmosis desalinator that is driven by said rocker arm; having a piston type force water pump driven by said floater oscillator; having a thin plate rectangular magnet push-and-pull electric generator driven by said rocker arm drive bar; having a multistage piston vacuum pump driven by said rocker arm; having a mist-spray-vacuum chamber evaporator that is activated by said vacuum pump and said force water pump to produce desalinated water by distillation processes; having a solar trap in the form of air bubble sheets or vacuum sandwich plates to cover as a blanket to provide solar heat into said evaporation vacuum chamber; or said structure being in the form of cluster of rigidly interlocked houses anchored out on the ocean stabilized by anti-oscillation resistors.

20 Claims, 5 Drawing Sheets

WATER-WAVE ENERGY CONVERTER SYSTEMS

CROSS-REFERENCE TO RELATED APPLICATIONS

This is a continuation-in-part of previous applications Ser. No. 07/255,657, filed Oct. 13, 1988, now U.S. Pat. No. 5,056,447, Ser. No. 07/472,753, filed Jan. 31, 1990, now U.S. Pat. No. 5,027,735, Ser. No. 07/376,002, filed Aug. 15, 1989, now U.S. Pat. No. 5,094,595, and a continuation-in-part of Ser. No. 06/820,082, filed Jan. 21, 1986, now U.S. Pat. No. 5,5052,902, which is a continuation-in-part of Ser. No. 06/631,322, filed Jul. 19, 1984, now ABANDONED.

The rights of the herein inventor is full as there is no government assistance in the development of this new invention.

BACKGROUND OF THE INVENTIONS

1. Technical Field

This new idea deals with the total conversion of the energy of the water waves into usable energy such as mechanical/electrical energy or compressed air which are used in the project site to desalinate sea water, to pump water, to drive a vacuum or compressor pump, to drive a push-and-pull electric generator. This new machine is a floating hollow sea wall designed to stop the water waves and allows no water wave behind it, hence, it creates a calm harbor for boats,for safe playground, for floating houses and enhance agricultural activities on the ocean floor.

2. Description of the Prior Arts

The existing water wave energy converters today are just simple power transfer mechanisms driven by impact walls that are being bumped by the water waves, or said mechanisms being driven by the buoyant force of the water waves upon floaters that move up and down, said oscillating floaters being attached to drive bars that activate piston type pumps. In the previous application No. 07/376,002, dated Aug. 15, 1989, U.S. Pat. No. 5,094,595, there is a claim for a hollow floating sea wall designed to absorb the energy of the water waves, but its structural configuration is not shown in details, and further, it is limited to produce compressed air only, it has no underwater apron wall below its compressor wall to prevent the water waves from getting behind the sea wall, and that there is no oscillating power device attached to the front of said wall.

The reference prior art U.S. Pat. No. 4,118,941 invented by John E. Bruce, entitled "Stressed Caisson Retained Island", presents a structural design for a circular wall, erected on shallow waters, in order to contain an earth fill to form an island, but it does not make use of the energy of the water waves, hence, it is irrelevant to these new inventions being presented, it being not a floating wall.

The reference prior art U.S. Pat. No. 4,540,313 invented by Kenneth R. Broome, presents a dam to create waterhead and a siphon penstock to deliver pressurized water to the electric generator, but it does not make use of the energy of the water waves to create the waterhead, hence, said invention is irrelevant to these new inventions being presented.

The reference prior art U.S. Pat. No. 4,993,348 invented by Leonard H. Wald, uses a turbine being submerged into the water waves to convert energy of said waves into electricity, uses solar cells and a steam engine thru focused sunlight to produce solar based electricity, and uses electricity to effect the reverse osmosis process and the freezing process for purposes of desalinating the sea water, but it does not show desalination by direct power transfer mechanism from the water waves which would eliminate the electric generator to reduce power lose in the process. In said reference invention, water distillation is done by steam boiling evaporation instead of a warm vacuum mist-spray forced evaporation process as being applied for patent in these new inventions being presented, hence, the above reference prior art is irrelevant to the herewith inventions being applied for patent.

In the prior arts:

a. There is no intention to produce a calm bay for a safe playground and to protect the shore lines against erosions by total break-up of the surf;

b. There is no concept to use the surf energy for the desalination of sea water thru vacuum forced evaporation and direct mechanical reverse osmosis;

c. There is no concept of a reverse osmosis wherein desalted salted sea water is being pumped out from under the sea instead of pumping up a large volume of salty sea water;

d. There is no concept wherein solar heat is being trapped to enhance evaporation of water from a vacuum in a purification or distillation process;

e. There is no concept wherein an apron wall is provided extending down below the floating wall to totally stop the surf and to increase surf pressure upon the compresion chambers;

f. There is no concept wherein a push-and-pull wide rectangular electric generator is being driven by the water waves, thru a flat elongated floater oscillator;

hence the prior arts do not present similar concepts as it is now being presented in this application for patent.

SUMMARY OF THE INVENTION

This new invention is created for the following objectives:

a. To provide relief to the problems obstructing the commercial use of the prior arts;

b. To introduce a new technology for desalination of sea water thru reverse osmosis by using underwater static pressure;

c. To introduce a new technology for forced distillation of water by using the energy of the water waves and by using solar energy being trapped by transparent vacuum insulator to warm up the evaporation vacuum chamber;

d. To introduce a new technology to drive a water turbine by a waterhead that is developed by water waves;

e. To introduce a new technology to produce electricity thru compressed air that is produced by the water waves bumping a floating sea wall, and to produce electricity by the use of a push-and-pull type electric generator;

f. To introduce a new technology for the construction of a floating sea wall that has the function and ability to totally stop the water waves, to convert the energy of the water waves into mechanical energy, to create a calm harbor, to protect the shoreline, and to serve as a floating house.

To attain the foregoing objectives, various new inventions, new designs, and new configurations, have been created and hereby applied for Patent Protection, such as, the following:

1. A new technology, wherein, a single or a bundle of light floater pipes is being oscillated up and down by the water waves, said oscillator pipe mechanically actuates a rocker arm or a drive bar, and said bar drives a pump, a push-and-pull electric generator, or drive a vacuum pump, alternatively or all at the same time;
2. A new technology, wherein, the high water pressure, acting upon the reverse osmosis membrane, is created under the deep sea water by pumping up the desalted water directly from under the sea to the drinking water supply line, thereby, energy is being spent for pumping the purified water only, instead of pumping large quantities of salt water at a very high pressure and then throwing away a large portion of said salt water back to the ocean, to avoid waste of too much energy;
3. A new technology, wherein, a floating sea wall creates and carries an elevated water that drives a water turbine, said turbine being built within said floating sea wall and mechanically connected to an electric generator and disposed to produce electric power;
4. A new technology of forced distillation by vacuum pump and water spray process, wherein, a regulated mist spray of water/liquid is allowed to enter a vacuum chamber that is being warmed up by sunlight and/or by other heating means, and wherein, the vapor from the mist is being pumped out by a vacuum pump;
5. A new concept of a window trap at various elevations acting as a one-way valve disposed at the vertical side of the hollow floating sea wall facing the incoming water waves to allow entrance of and to trap the water into the internal chambers of the hollow wall, in order to create elevated water and/or compressed air;
6. A new concept of an apron wall disposed below the hollow floating wall to prevent spill-thru of the water waves under the sea wall, in order to prevent creation of waves behind the sea wall and to increase hydraulic ram or water wave pressure upon the intake valves of the hollow sea wall and upon the oscillating floater pipe power transmitter;
7. A new design of a transparent heat insulator to trap solar heat and to prevent the heated material from getting in contact with the cold wind, in the form of air or vacuum sandwich in between transparent plates;
8. A new concept of a rectangular push-and-pull electric generator that is driven by the mechanical oscillation of the water waves, wherein, the magnets are arranged to form a wide and thin rectangular plate that is forced to move back-and-forth into a thin rectangular cavity which is made up of induction wire coils, and a DC/AC power output cynchronizer is provided to work with other generators;
9. A new design for a floating wall, wherein, the vertical floater caissons are evenly spaced apart along the length of the floating wall to serve as floater end posts between the segments of the energy absorbing wall so that said caissons will not interfere against the incoming surfs, and wherein, a straight vertical edge pointed nose is attached to the front side of each caisson to split the incoming surfs without destroying energy;
10. A new design for a wide face anti-oscillation resistor board, wherein, said board is a thick sandwich of foam plastics, such as, styrofoam, or compressed air pipes for most of its internal laminates which make up most of its thickness, in order to make said board stiff and help float up the floating sea wall;
11. A new technology for constructing light and stiff structures, wherein, caissons and pipes are laminated crossing each other and filled up with pressurized plastic foam or with compressed air;
12. A new design for a floater drive oscillator, wherein, the cross-section of said floater is made into a flat rectangle so that it will attain its maximum buoyant power at the first 4th point of the surf; and
13. A floating house made of plastic foam sandwich/laminates.

The structures of the apparatus may be constructed out of plastics by composite method, which are in the forms of reinforced laminated materials to meet the requirements of the sea water. Aluminum alloys, stainless steel, and treated lumber may also be used to cut down cost. Most of the structures and materials in this apparatus should be in cylindrical form, because a thin pipe can become stiff against bending and able to withstand the underwater static pressure when it is filled up with high pressure compressed air or high pressure plastic foam. A laminate of fiber glass in and around said structures may serve as tension reinforcement for said structures.

This new invention is relievant to the problems of and distinct from the prior arts on the following points:

1. The new concept of an under sea reverse osmosis apparatus reduces the excessive energy spent for pumping up large volumes of sea water to a higher elevation at a very high pressure and then throwing back a large portion of it to the sea to flash out concentrated brine, as it is being done in the existing commercial mehtod of desalination;
2. The free energy of the water waves and the solar energy are used in this invention as substitutes to burning fuel in the process of desalination of sea water;
3. The floating sea wall, being a structure for protecting the shoreline against erosion becomes a six purpose structure, hence, it is low cost structure, the purposes being: (a) to produce drinking water; (b) to produce usable energy; (c) to protect the shoreline; (d) to create a safe harbor; (e) to enhance agricultural activity on the ocean floor; and (f) to create a dwelling place;
4. Desalination is done by forced distillation thru vacuum and mist spray process of evaporation with the use of solar heat and multistage vacuum pump driven by the water waves as main source of energy, and wherein, condensation is done by compressing the water vapor at the exit end of the said multistage vacuum pump;
5. The creation of elevated water that drives the water turbine is done by the impact of the surf upon the vertical face of the sea wall that allows the entrance of water thru a plurality of one-way window valves in various elevations, instead of using pumps to elevate the sea water;
6. The water wave being a push-and-pull mover, it is just appropriate to make the electric generator into a push-and-pull machine by moving the magnets up and down in between the induction wire coils to cut magnetic field. Due to low frequency of the water waves, but having enormous force, it is but logical to build a large magnetic field to be cut by large quantities induction wire for every movement of the surfs, in order to generate large quantities of electricity for every stroke of the water waves, hence, the herein new invention presents a wide rectangular plate formation of the magnets, one face of said plate magnet being North Pole while the other face being South Pole, and also presents a corresponding rectangular formation of the induction wires, hence, a new concept of a rectangular electric generator is born. This push-and-pull electric generator may also be constructed into a circular form, wherein, the center circle is a coil of induction wires wound along its circumference thereby forming an appearance similar to that of a pipe or a drum, the second circle/drum is a formation of a plurality of magnets forming a thick pipe that is free and clear from the first drum, the third and outer drum is another coil of induction wires wound along its circumference to form another large pipe that is free and clear from the second pipe, in order to cut magnetic fields on both sides of the magnet pipe. Hence, these concepts relieve the problem on how to make the water waves directly drive an electric generator;

7. The new concept of making the wide face board anti-oscillation resistor into a floater structure, such as a foamed plastics sandwich, or a compressed air pipe sandwich or composit plastics, is also a break-thru and minimizes the use of the floater caissons;

8. The new concept of filling up the floater caissons with compressed air or pressurized plastics foams also removes the problems on water leaks getting into the caissons, at the same time makes the caisson structurally much stronger against compression and bending, hence, the caissons may now be made of lighter materials such as plastics, lumber, or thin metals, intead of concrete. Hence, this is also a new invention;

9. The new procedure in trapping or absorbing solar heat to enhance distillation, wherein, the material being heated is insulated from wind contact by covering it with a multilayer/spaced transparent sheets having vacuum or air spaces in between as barrier against heat transfer in order to allow sunlight to get into the material being heated, but the heat is prevented from backing off as the material being heated is painted flat black and not being in contact with the wind. This procedure increases significantly the efficiency of solar heating processes in any application;

10. The creation of the apron wall hanging from the floating sea wall and extending down under water, beyond where there is no more oscillation of the water, is a new break-through that prevents spill thru of the water waves under the floating sea wall and enhance the function of said sea wall, hence, there is no water wave behind said wall;

11. The creation of a flat rectangular floater, that attains maximum buoyant power early enough, surpasses the efficiency of oscillators of the prior arts; and 12. The new concept of making the floating sea wall as a dwelling house, and construction of floating houses on the created harbor.

DESCRIPTION OF THE PREFERRED EMBODIMENTS

Accordingly and pursuant to the objectives of this invention as enumerated in the summary, the following new designs and embodiments are created to provide the most appropriate technology which can be more understood by further reading the descriptions of the figures.

Figure 1:
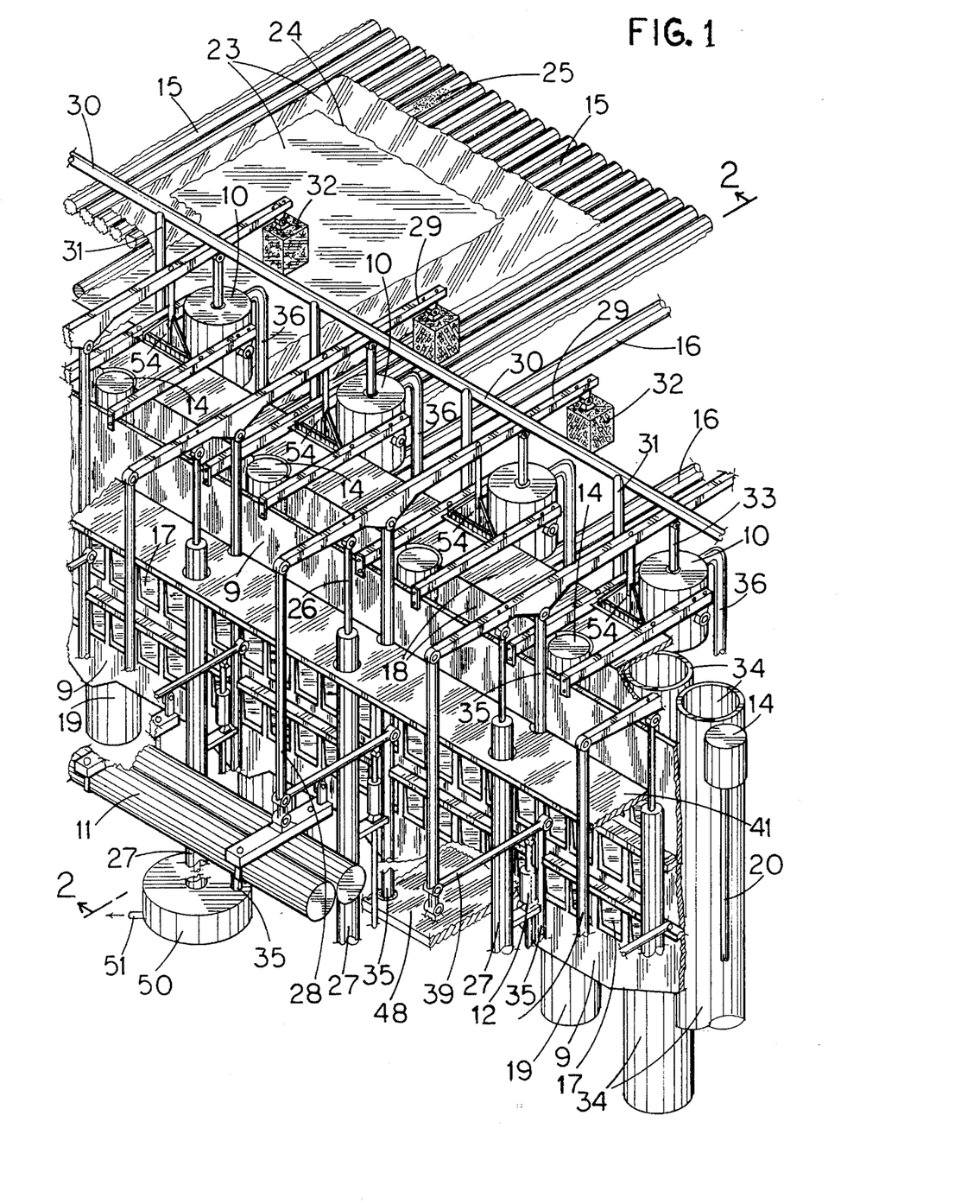
FIG. 1 illustrates a perspective view of the floating hollow sea wall showing mechanical connections.
Figure 2:
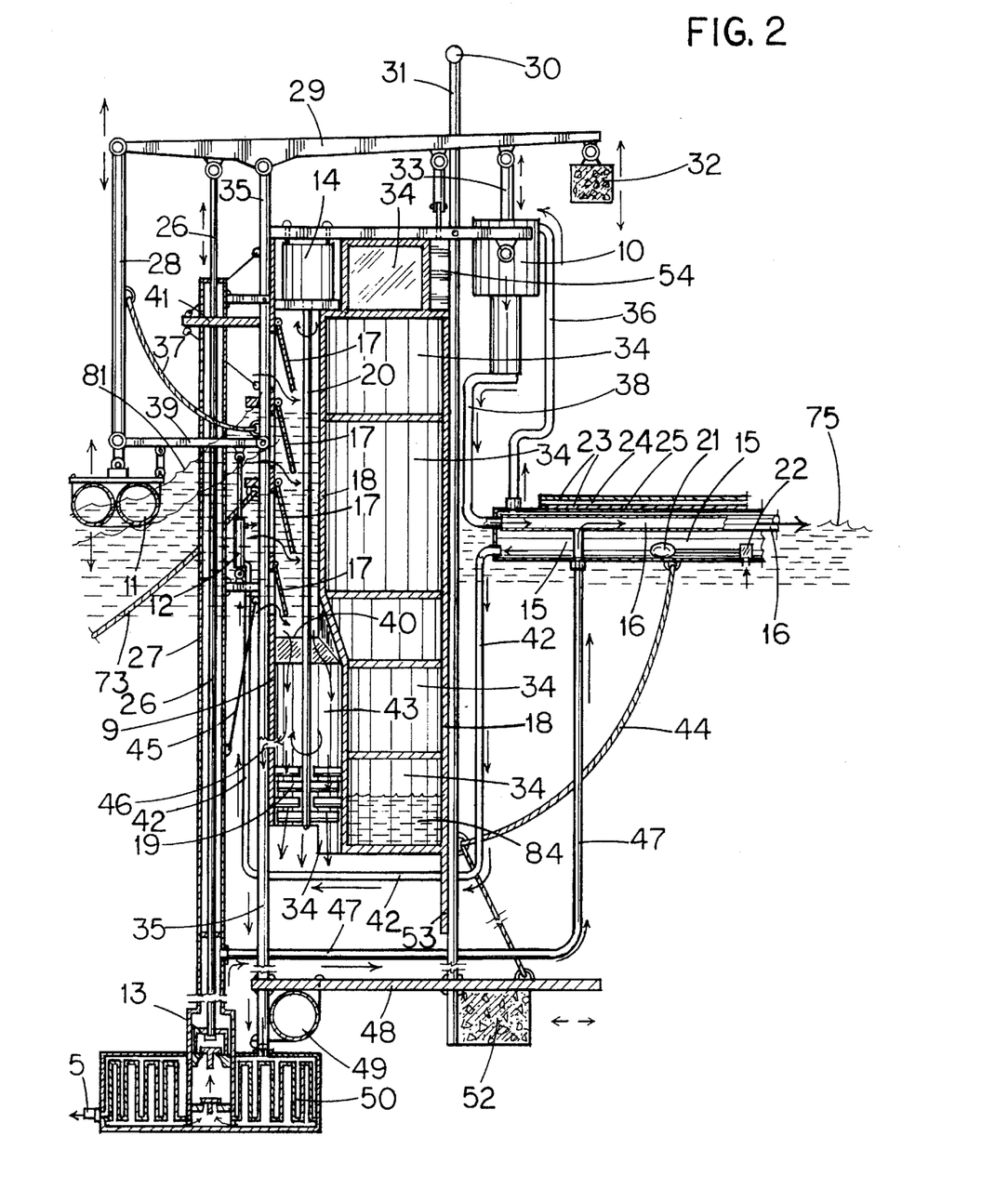
FIG. 2 illustrates a vertical cross section of FIG. 1 along line 2—2.

FIG. 1 and FIG. 2 illustrate the embodiments of a floating hollow sea wall consisting of walls 18 and cavities 34 in between walls as the main sea wall structure. Cavity 34, the main floater of the sea wall, maybe in the form of cylindrical caissons or rectangular caissons that are empty or filled up with compressed air, or filled up with foamed plastics to prevent water from getting in, even if there is a leak. The walls of the caissons may serve as wall 18 of the sea wall. There are 3 vertical walls of the sea wall. The front impact wall 9 contains a plurality of window one-way valves 17 at four levels, at least, in order to trap the water of the in-coming surfs of various sizes. The space between the impact wall 9 and the middle wall 18 and the horizontal floor 40 defines the water tank that holds the entrapped surf water at an elevated position to create a waterhead that drives the water turbine 19 by letting the water drop down thru the large vertical water shaft 43. The water turbine 19 drives the electric generator 14 by turning the drive shaft 20. The water tank 84 serves to maintain the steady elevation of the floating wall 18 in relation with the undisturbed water level 75 thru the use of any appropriate automatic water pump that expels the water 84 when the surfs 81 are too large in order to create more waterhead above the water turbine 19, but pump back in the water 84 when the surfs are just regular sizes. The horizontal oscillating float pipe 11 is being moved up and down by the water waves 81 and in turn activates the rocker drive arm 29 via push rod 28. The Rocker arm 29 pivots on the top of the post 35, and, therefore, the piston rod 26 of the under sea deep well water pump 13 moves up while the piston of the multi-stage vacuum pump 10 moves down, and the magnet case of the push-and-pull rectangular electric generator 54 moves down every time when the oscillator float pipe 11 move up due to the incoming waves 81. As the deep well pump 13 takes out the desalted water from chamber 50, a high waterhead is developed equal to the depth of chamber 50 from the water surface 75 plus the waterhead acting at the water turbine 19 via the inlet hole 46 thru pipe 35, and therefore, the high pressure sea water acts upon the membranes that are disposed in the chamber 50, hence, the reverse osmosis process goes working to desalinate sea water. The sea water behind the membrane becomes more concentrated brine, and so, it is being continuously flashed out thru exit 5 by the fresh sea water dropping down from chamber 40 via inlet 46 and via pipe 35, so, as the water at the back of the membrane tends to become concentrated brine, it is continuously being replaced by low salt sea water.

It should be noted at this point that, in the case of the oscillator pipe 11, the larger the vertical diameter of pipe 11 the taller is the required surf to make it attain maximum buoyancy, the force that activates rocker arm 29, hence, it consumes a good height of the surf before it works in full power. Therefore, the ideal cross section of the oscillator 11 is a flat horizontal rectangle; so that it will attain its maximum buoyant power early enough at the fourth point of the average surf. Hence, it is best that at least two (2) light pipes be bundled together side-by-side for the oscillator 11, filled up with pressurized foamed plastics, and the spaces in between said pipes filled up with impervious foamed plastics sandwich, in order to form a flat rectangular buoy and made stiff enough not to be bent by the surf 81.

The desalinated sea water is pumped up by part 13 out of the reverse osmosis chamber 50 passing thru pipe 27, channeled thru pipe 47 and into the main drinking water supply pipe 16. The deep well pipe 27 is extended well above the ocean surface 75 in order not to allow salt water getting into the deep well 27. In times of violent weather or when the surfs are oversized, the amplitude of the oscillator 11 tends to over drive the rocker arm 29 thereby endangering the other parts #13, #10, and #54, hence, the rope 37 is disposed to limit the upward amplitude and another rope of same kind and function disposed to limit the downward amplitude of the oscillator 11 which will just get submerged into the surfs. The pipe 27, being empty, may be made large enough, in order to produce enough buoyant force to carry the weight of the chamber 50. Chamber 50 will also produce buoyant force to carry its own weight if foamed plastics or empty pipes are incorporated in its construction.

The window traps 17 are one-way valves, that absorb the excess surfs not flatten by the oscillator 11, being pushed in open by the bumping surfs, thereby, filling up the water tank above the floor 40. The level of the water in said tank rises up during violent weather as the oversized surfs will be hitting the upper most windows 17 and also hitting the overhead horizontal surf-suppressor wall 41, thereby producing a higher surf pressure to push-in the higher most window trap 17, hence, there will be more water pressure that will be driving the water turbine 19, resulting to a more electric power produced by generator 14.

The wide faced board anti-oscillation resistor 48 is disposed under the sea wall 18, at a depth where there is no more oscillation of the water particles, in order to prevent sudden upward movement of the whole floating sea wall when the surfs exert upward buoyant forces upon the oscillator float pipe 11, upon the main floater caisson 34, and upon the over head surf-supressor wall 41, in order that the oscillator float pipe 11 will be able to impart more force upon the rocker arm 29. Said anti-oscillation resistor board 48 is built stiff enough by composite construction in the form of foam plastics sandwich, or in the form of a horizontal array of floater pipes that are sandwiched between two horizontal fibrous thin plates, hence, said resistor board will contribute buoyant force to float the sea wall.

The floater pipe 49 is added to the structure to balance the extra weight of the elevated water above the floor 40.

The weight 52 is an additional balancer to keep the sea wall upright. The weight 32 is disposed at the end or at the middle of the rocker arm 29 in order to neutralize the weight of the oscillator pipe 11 and also to neutralize the weight of the piston rod 26 from acting downward against the buoyant force of the surf upon the oscillator pipe 11.

As the rocker arm 29 moves up and down, it activates the push-and-pull electric generator 54, hence, electricity is also produce by oscillation movements of the surfs 81. The rocker arm 29 also activates the multistage vacuum pump 10 via piston rod 33. The evaporation chamber 15 is vacuumized by the vacuum pump 10 via pipe 36 and the desalted water vapor from vacuum chamber 15 is compressed by said vacuum pump 10, via pipe 38, into the condensation pipe 16 where the vapor becomes liquified into a desalinated water and delivered to the supply end. The float valve 21 and 22 is similar to that of the check valve in the toilet tank. It is disposed to maintain the level of water at one-fourth (¼) full of evaporation chamber vacuum pipe 15, wherein, the sea water enters said vacuum chamber by a fine mist spray of water.

It should-be noted at this point that "the rate of evaporation of water, below boiling temperature, is directly proportional to the surface area of water exposed to the atmosphere", and that "the rate of evaporation of water is inversely proportional to the atmospheric pressure acting upon the water surface", and that "the rate of evaporation of water is directly proportional to the temperature of the water being evaporated". Since there being no fuel to boil the water, in this newly invented process of distillation, the evaporation of the sea water is done below boiling temperature. The evaporation chamber 15 is maintained at vacuum pressure by means of a multistage vacuum pump 10 that has been claimed under U.S. Pat. No. 5,052,902, FIG. 1, to remove atmospheric pressure holding back the water molecules from becoming volatile. This means to say, that creating a vacuum around the surface of a liquid is giving the molecules of that liquid the full freedom to fly out, hence, the sea water will be evaporating very fast at a temperature below its boiling point. Since evaporation is a cooling process, it will make the water approach its freezing point and becomes a solid ice wherein evaporation will stop. As the sea water solidifies into ice, all the salts will get separated and the ice is desalted, and the desalinated sea water maybe harvested in the form of ice if the labor in the project site is cheap, but labor in the United States is too high, hence, in this invention, it is preferred that the desalinated water be harvested in the form of vapor so that it will be easy to transfer it by pumping thru pipe lines. As evaporation goes on, the sea water in the vacuum chamber 15 becomes a concentrated brine, hence, it is necessary to pump it out from the vacuum chamber 15 thru pipe line 42 by means of the force piston pump 12 that is being activated by the float pipe oscillator 11, wherein, in so doing, the high temperature, average 65° C., sea water gets into the vacuum chamber thru valve 22 and prevents the freezing of the brine, although it suddenly drops in temperature due to the mist water spray. But since the evaporation chamber 15 being always in contact with the outside sea water 75, at 65° C., said chamber 15 continously absorbs unlimited supply of heat energy from the ocean to enhance evaporation in said chamber 15. As more heat is needed to enhance evaporation, the condensation chamber 16 is made to pass thru and inside said evaporation vacuum chamber 15, wherein, by heat exchange, the vapor gives off heat in the process of condensation and compression by pump 10 to help heat up the salt water being evaporated in chamber 15. In addition, the warm desalinated water coming from the reverse osmosis chamber 50 thru pump 13 also passes inside the evaporation chamber 15 for the purpose of supplying heat also.

As more heat energy is needed for the evaporation process, heat is further supplied by solar energy, wherein, a newly invented transparent solar trap 23, 24, & 25 is used to bring in sunlight to heat the outside surface of the vacuum chamber 15. The sunlight is not allowed to bounce back upward so that it will get absorbed by the evaporation chamber pipe 15. This is done by painting the surface being heated, the evaporation chamber 15, with flat black paint 25 or by spraying it with powdered charcoal 25 or black sand to prevent it from getting shinny. At the same time, said surface of the evaporation chamber 15 is insulated from getting in contact with the free air or the cold wind in order not to dissipate the heat energy that has been imparted to it by sunlight, by means of at least two (2) layers of transparent sheets 23 with an air space 24 or a vacuum in between sheets 23 that are disposed horizontally on top of and to cover said evaporation chamber 15. Said evaporator 15 is in the form of a plurality of float pipes that are strong in compression against the outside atmosphere, that are disposed horizontally side-by-side floating on the calm water side of the floating sea wall 18 to form a wide and long flat deck on the ocean. Said solar insulator cover sheet 23 may be in the form of a hard and thick laminate or composite of transparent plastics or glass to form a hard wide deck on the ocean to serve as a clean playground for roller skater, for airport, and wind sail skates, while the floating sea wall serves as a dwelling house for fishermen. The tie rope 44 is disposed to hold the floating evaporator 15 from drifting or getting away from the sea wall, and at the same time, it makes the floating evaporator 15 to serve as additional floater for the sea wall 18 specially during violent weather, wherein, there is too much elevated water being trapped by the window valves 17 due to oversized surfs 81. The weight 52 may also be disposed further to the right, by providing a longer structural beam extension of the oscillation resistor 48 to hold said weight 52, in order to neutralize the extra load at the left side of the floating sea wall 18, for the same purpose, the floater pipe 49 is also being emptied of its water content to neutralize the elevated water during violent weather. Anchor rope 73, which is preferably in the form of a kite sling to keep the sea wall erect, is disposed to hold the whole wall 18 against the horizontal push force of the surf 81 and of the wind. Fuel powered engines may also be installed and carried by said floating sea wall to augment energy for the desalination processes.

Figure 3:
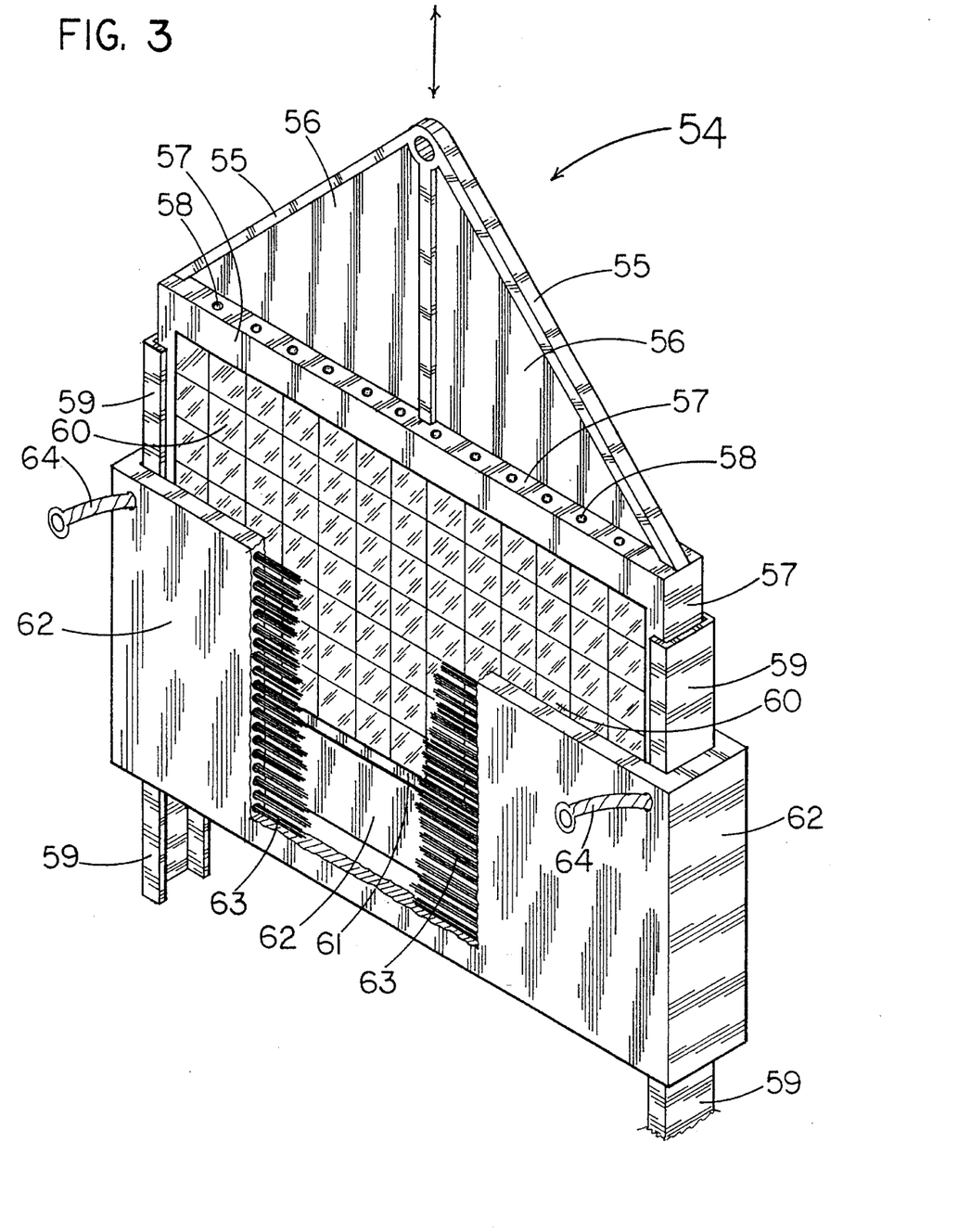
FIG. 3 illustrates a perspective view of the rectangular push-and-pull electric generator.

Referring to FIG. 2 and FIG. 3, the weight of the moving magnet assembly 55, 56, 57, 58, & 60, for the rectangular electric generator 54, also serves as a neutralizer against the weight of the deep well piston rod 26 and against the weight of the oscillator float pipe 11, therefore, the weight 32 may be reduced or eliminated.

Referring now to FIG. 3, there is shown the embodiment of an additional new invention, named the Push-and-Pull Rectangular Electric Generator, part #54, consisting of a conductor coil 62 that is in the form of an immovable rectangular box with a hollow center into which a smaller rectangular assembly of magnets 60 is being forcibly pushed in and pulled out thru sliding bearing 59 in order to generate electricity which is harvested thru the output terminals 64. The assembly frames 55, 56, 57, 58 & 61 take hold of the plurality of bar magnets 60 into one whole assembly so that they act and move as one piece in one pick-up point only. The frame 62 take hold of the conductor wire coil 63 in a permanent good shape. The DC output is converted to AC to match with the utility grid.

Figure 4:
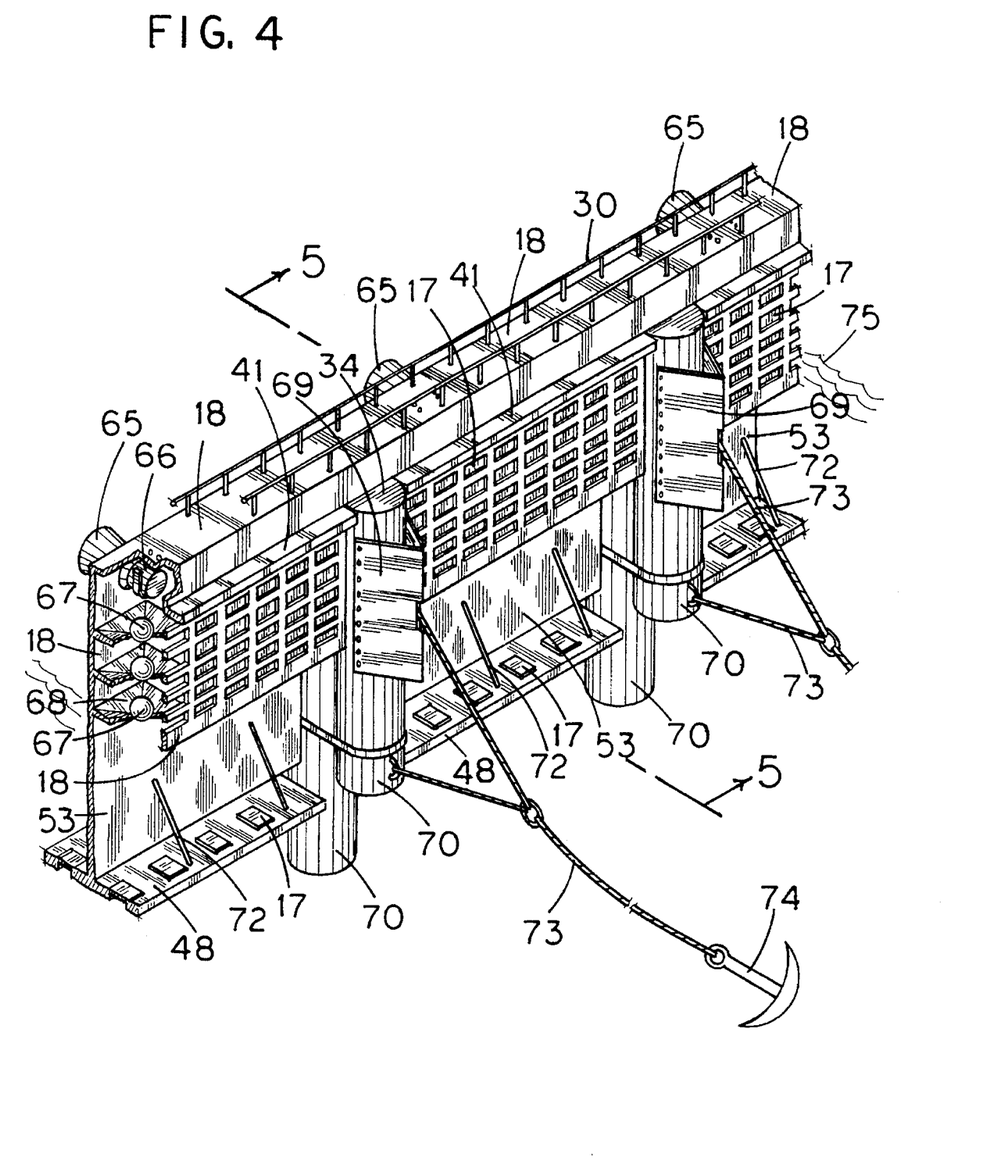
FIG. 4 illustrates a perspective view of another floating hallow sea wall fuctioning as an air compressor.
Figure 5:
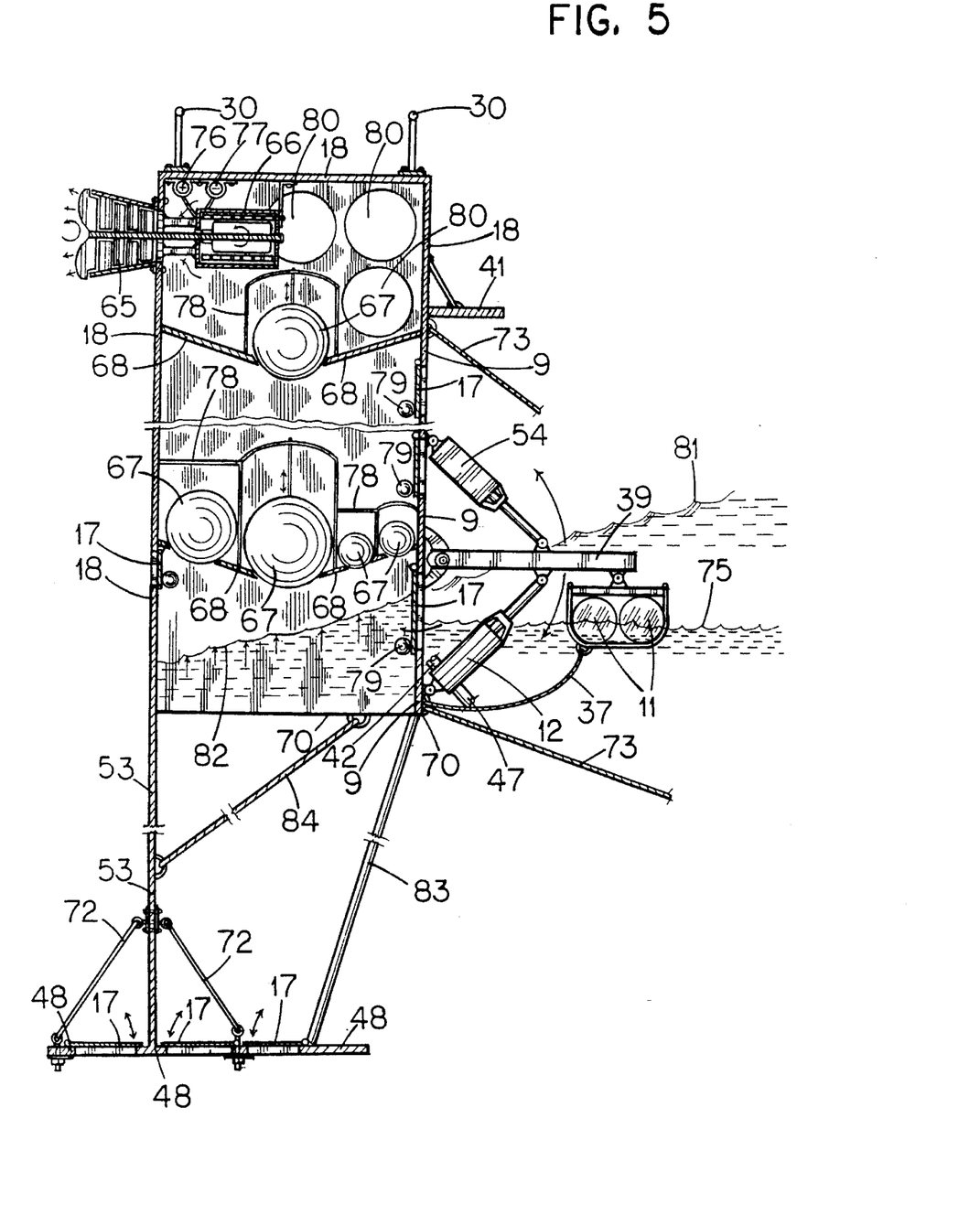
FIG. 5 illustrates a vertical cross section of FIG. 4 along line 5—5.

Referring now to FIG. 4 and to FIG. 5, there is shown a revised embodiment of the floating sea wall 18, wherein, said wall 18 is built to be an air compressor, instead of carrying elevated water, by using the rising water surface 82 to serve as the compressing piston, with the provision of a built-in air driven electric generator 66 that is driven by the air turbine 65, and wherein, the floater caissons 34 are disposed to be evenly spaced and serve as end posts of the equal length segments of the floating sea wall 18. In this case, the sea wall is an open bottom hollow wall 18 that vacuumizes to take in new air during the valley cycles of the water waves 81. The caisson 34 is also provided with water chamber 84, as shown in FIG. 2, as a means to adjust the wall's elevation with the changing sizes of the water waves, such that the bottom lip 70, of the front impact wall 9 facing the incoming surfs, is submerged at least one foot below the undisturbed water level 75. Using a water-wave amplitude detector, an automatic pump brings in more water into the chamber 84 when the water waves increase in sizes, in order to submerge down deeper the bottom lip 70 in relation to the undisturbed water level 75, in order to trap larger volume of air into the bottom chamber during the valley cycles of the large sized water waves. The pointed edge nose-wall 69 is disposed to split the surf without destroying energy and deflects the surf to splash upon the window traps 17 instead of breaking up upon the caisson post 34.

The Apron Wall 53 serves as a downward continuation of floating wall 18 and is disposed to totally stop the surf 81 that tends to spill thru under the floating wall 18, at the same time, to deflect the excess energy of the surfs 81 upward to give more compression ram effects upon the entrapped air in between the floating front impact wall 9 and the rear wall 18. The Apron Wall 53 also serves as a structure to take hold of the wide faced anti-oscillation resistor board 48 that prevents the sudden upward movements of the floating wall 18 due to the buoyant forces and impact forces of the surfs 81 being rammed against the faces and the open compression chambers of the floating sea wall 18.

The anti-oscillation resistor board 48 is horizontally disposed deep below water surface where there is no more oscillation of the water particles, approximately at least three times the height of the water waves. At this position any attempt to suddenly move up said resistor board 48 will be resisted by the weight of the column of water directly above it, plus the atmospheric pressure directly on top of said column of water. The anchor 74 being locked on the ocean floor also holds down the floating sea wall 18 against being lifted up by the water waves via anchor rope 73 at the same time prevents the said wall 18 from being horizontally pushed back by the surfs. Additional anchor ropes 73 and 74 may be disposed to hold the wall 18, in between caisson post 34, against horizontal forces of the surfs that tends to bend the sea wall as a whole structure at a horizontal direction. There is a plurality of upward window one-way valve 17 disposed on the said anti-oscillation resistor board 48 in order to facilitate the downward movements of the whole floating sea wall 18 because there is a need to put it back to its original floating level in relation with the undisturbed level 75 of the ocean every time said wall 18 has been lifted up by the surfs 81. There is less volume of air being compressed if the bottom lip 70 of the impact wall 9 is exposed too high above the mean water level 75. Said bottom lip 70 of the impact wall 9 should be exposed open to the air at a maximum of one foot above the valley surface of the surf 81 in order to take in new air but it should be closed immediately by the water surface as soon as the water surface piston 82 starts rising, in order to take advantage of the full height of the amplitude of the surfs 81. The redundant strut 72 is disposed to maintain the square relationship between the apron wall 53 and the resistor board 48, and to prevent downward bending of the resistor board 48, at the same time, to protect the joint between apron wall 53 and the resistor board 48. The redundant strut 83 is also disposed for this purpose.

As to the size of the floater caisson 34, it will be much more advantageous to have the caisson 34 in large diameter with shallow submergence as its buoyancy increases or decreases very rapidly in relation to its diameter because of large volume of water being displaced for every small increase of submergence. Hence, large diameter caissons 34 provide a very stable floating level for the floating wall 18 in relation to the undisturbed sea level 75.

There should be at least two (2) stages of compression chambers built in into the hollow floating sea wall 18, in order to take advantage of the larger sizes of the surfs 81 bumping up to the higher window traps 17 of the impact wall 9. The first stage compression chamber is defined by the bottom lip 70 and right below the lowest float ball valve 67. The second stage compression chamber is the space above the lowest float ball valve 67, and the last stage compression chamber is the space below the top float ball valve 67. The space above the top float ball valve 67 is a reservoir for compressed air interconnecting all other reservoirs along the whole length of the floating sea wall 18. The air turbine 65 serves as an exit of the compressed air that drives or turn the said turbine 65 which drives the electric generator 66 that is securely attached right below the top road way roof of the floating wall 18. The turbine driven electric generator 66 supplies the electric power needs for the operation and maintenance of the floating sea wall 18, at the same time, supplies energy for desalination processes and for the community consumption, its DC output being converted into AC by a current cutter and transformer to synchronize with the utility grid.

The whole floating sea wall 18 is preferably made of composite construction material and laminate materials to make it of high flexural strength and to be able to float or to contribute floating effects upon the whole structure, such construction being a sandwich of impervious plastics foams or sandwich of impervious pipes that are filled up with foam or compressed air. The outer skins of such sandwich constructions may be made of salt-resistant strong fibers or metals. Truss construction may also be adapted to provide stiffness to the whole sea wall 18.

As shown in FIG. 5, it is imperative to have as many float ball valves 67 as possible in the first and second compression chambers, in order enhance rapid drop down of the excess water that got into said chambers when the water piston 82 has an excess amplitude and rises up to the second compression chamber due to oversized surfs during violent weather. As the surf 81 bump the sea wall 18, the window valves 17 are pushed in open there by allowing the water to get into the chambers and in effect will compress the air inside the chambers. At the same time the water piston 82 rises up into the chambers effecting compression upon the air that is trapped in the chambers and floating up the ball valves 67 as the water rises up to the upper chambers. Immediately, as the pressure of the compressed air builds up, the upper window valves 17 gets closed. The floated ball valves are kept near their seats by means of the limiting cage 78 to close the chamber as soon as the water has drained down. The process of compression by the rising water piston 82 and its draining down out of the chambers should be done very quick because the period of time for the water wave cycle is very short, that is why there should be as many as possible ball valves 67 in the first and second stage chambers. The weight 79 is disposed on the window valves 17 to enhance closure of same valve 17 to trap the compressed air. The window 80 inter-communicates all the other air reservoir chambers along the length of the said floating sea wall 18. It is imperative that the upper most chamber, which serves as the compressed air reservoir chamber that supplies compressed air to the air turbines 65, be a continuous chamber all along the length of the floating sea wall because some of the said turbine 65 will be automatically closed when the air pressure is low, in order to continuously produce electricity at any size of the water waves. By means of a pressure gauge sensor, all the turbines 65 are set to run or stop at a certain designated air pressure in the reservoir, in order to wait for the air pressure to build up to run a few turbines when the water waves are low. The horizontal surf-suppressor wall 41 is disposed to stop the splashing surf from rising up beyond the height of the sea wall and to increase surf pressure upon the window valves 17. The anchor rope 73 is disposed to hold the sea wall 18 against the impact of the surf 81 and to increase surf pressure upon the window valves 17. The large conductor wires 76 and 77 will carry and distribute all the electric power produced by the generator 66. The rail guard 30 serves as safety fence for the roof top roadway of the floating sea wall.

There being then a calm harbor and refuge area behind said wall 18, houses and office buildings made of floating honeycombs maybe constructed behind said wall for commercial and industrial purposes.

Referring further to FIG. 5, there is shown the redundant strut 83 which acts to further reinforce the wide board anti-oscillation resistor 48 against downward bending and to prevent the floating wall 9 & 18 from being lifted up by the in-coming surf 81 thru the action of the water piston 82 and the action of the buoyant force upon the float pipe oscillator 11. Said strut 83 further acts to control or prevent the apron wall 53 from being pushed backward by the surf 81 and get dis-aligned from the vertical wall 18 and get destroyed. As the water wave 81 is stopped by the walls 18 and by the apron wall 53, the moving water waves attains a hydraulic ram situation, thereby, producing great water pressures in all directions, pushing the apron wall 53 backward, and lifting the whole hollow wall compressor 9–18 upward thru the effects of the rising water piston 82, as the whole apparatus is held stationarily by the anchor ropes 73 against the rearward push by the surf 81, hence, the restraining rope 84 is disposed to hold back the apron wall 53 against the hydraulic ram pressure, the same is true with the redundant strut 83 being disposed to hold the floating wall 18 and the impact wall 9 from rising as the hydraulic ram pressure will also act downward upon the horizontal wide face baord anti-oscillation resistor 48.

Referring further to FIG. 5, there is also shwon a high energy power transfer mechanism in the form of a floating pipe oscillator 11, which is the same oscillator as that part 11 shown in FIG. 1 & 2. In this case, the horizontal drive arm 39, being oscillated by the float pipe 11, drives a piston water pump 12 disposed below said arm 39, and also drives a push-and-pull wide rectangular electric generator 54 which is the same type of a genetator presented in FIG. 3. The pump 12 and the generator 54 are preferably disposed at least 45 degress or more from the horizontal drive bar 39 to maximize amplitude of the piston and the armature inside the chambers of said pump and said generator, it being that the pump 12 and the generator 54 will be along the line of arc action of the pivot connector points of the piston rods at the bar 39 which also pivotes at its rear end. The oscillator floater pipe 11 is most effective if its cross-section is in the form of a horizontal flat rectangle instead of a circle, as has been discussed or discribed in FIG. 1 and FIG. 2, which may be attained if two or three pieces of pipes are bundle together side-by-side to form a horizontal flat rectangular floater with smaller floater pipes and styrofoam fillers bundled and disposed to fill up the lower spaces between the larger pipes to increase water displacement at the bottom of said flaoter-oscillator pipes 11. The restraining rope 37 is provided or disposed to prevent the oscillator pipe 11 from moving up too high beyond safe limits during violent weather, hence, rope 37 should be stronger than the maximum buoyant force acting upon said oscillator pipe 11.

For purposes of desalination of sea water, to supply drinking water, the piston water pump 12 and the push-pull electric generator may both be made to be piston water pumps to supply large volumes of high pressure sea water for reverse osmosis or mist spray vacuum evaporation processes. Same water pumps may also be used to store energy in the form of elevated water that may be used to generate electricity thru hydroelectric water turbines or to desalinate sea water by reverse osmosis at a later date. Said water pumps may also be replaced by axial-flow compressor pumps to produce compressed air for all purposes.

As has been discussed in previous pages, this floating sea wall creates a calm harbor bay or safe refuge behind it, and this safe calm area on the ocean may be used, as a concession for the developer, as a private lot property in which to build industrial, commercial, and residential dwelling buildings which may be constructed in the form of composite, laminated, monolithic reinforced plastics buildings in long rigid interconnected spans that are able to flatten the water waves, said floating buildings being provided with underwater horizontal wide-faced anti-ocillation resistor boards 48.

It should be noted at this point that these inventions or new ideas presented are not limited to the configurations, apparatus, systems, processess, construction methods, construction materials, and scientific principles herein presented, but also include various other forms or configurations that produce other various forms of benefits, of which, the herein inventor hereby reserves the all the rights and privileges for himself.

One variation of configuration is that said thin plate magnet and said thin plate induction wire, for purposes of designing an electric generator, are made into circular disks and are assembled alternately in between each other, and are driven to spin oppositely against each other, by means of any power machine.

Another variation of configuration is that said magnet and said induction wire coils are each made into pipes/drums to form a multi-layer pipe generator, and are driven to rotate oppositely in order to double the relative speed of the electric generator.

What I claim, for which protection by a Letters Patent is applied for, are as follows:

1. A hollow honeycomb multichambered elongated structure, that floats on water and stops the surfs for a long time, anchored floating on deep open waters parallel or oblique to the water waves to serve as a house or work station or as a shelter against the water waves, such as being an elongate floating sea wall to create a clam harbor or a place of refuge for boats, for floating houses, for agricultural activities on the ocean floor, for recreational playground, for fishing, and to protect the shore line against erosion, which breaks up the water waves and converts the energy of same into usable energy such as mechanical, electrical or compressed air for community consumption or for other purposes, including, desalination of sea water for community consumption, and which structure carries machineries accessories for desalination, a solar trap insulator, a road way, and other purposes, comprising:

section a: a main body hollow honeycomb impervious multichambered structure set floating out on the open waters purposely formed to carry loads and resist the surfs, to contain light materials such as foam plastics and compressed air so that it will float on water, to have many chambers that are used as residential house or work chambers that provide more floating power for said structure, a plurality of which are being joined and braced together to form a long line of floating sea wall, comprising:

a plurality of cylindrical or rectangular vertically disposed side-by-side caissons interlocked to each other to form along line of wall structure that has high rigidity against bending stresses and floated parallel to the water waves;

a water tank at the bottom of each caisson that is being filled up with water and being replaced with compressed air automatically to maintain and increase the floating level of each said caissons during violent weather;

a water proof entrance door and window, on the upper walls facing away from the surfs, at the upper chamber of each caisson to make it good for human dwelling;

a stairway leading to said dwelling chamber;

said upper chambers of the caissons being intercommunicated to form a multiroom dwelling house;

a pressurized foam plastics and compressed air injected into the middle chambers of each said caissons to prevent water leakage into the chambers and to provide strength against the outside water pressure;

a wide flat roof to cover said sea wall, made strong enough to serve as brace against horizontal bending of the whole sea wall and to serve as a roadway to service the whole project;

a guard rail erected on top and both sides of said roof/roadway, made up of reinforced plastic pipes, to serve as conduit for electric power and water supply;

the walls, roofs and bottom of said caissons being made up of composite and sandwich construction of honeycomb, foamed, hollow, fibrous and durable materials having various reinforcements, including fiberglass, to cut cost and make it float on water;

section b: a means to breakup and absorb the water waves completely and store same into an elevated water that drives a water turbine to produce electricity, comprising:

an impact wall vertically or inclined against the surfs, disposed at a distance from the surf-side walls of said caissons to receive the direct impact of the incoming surfs, and to form a water tank with the walls of said caissons to contain and carry the entrapped elevated water;

a horizontal floor at the bottom of said impact wall connecting said impact wall to the walls of the caissons to form the water tank that carry the elevated water;

a flat roof covering the top of said water tank and connected to the roof of said caissons to form a roadway and to create compressed air acting upon the top surface of said elevated water for more power to the turbine;

a main suppressor wall horizontally attached to said impact wall at least at a height equal to the tallest expected surf in the project site, and extends at least five feet horizontally outward against the surf to increase surf pressure against the impact wall;

at least two additional smaller suppressor wall disposed at the third points between the undisturbed water level to the main suppressor wall and attached to said impact wall to maximize surf ram pressure upon the intake window valves of the impact wall out of the smaller water waves;

said suppressor walls being built strong to serve as stiffener for the whole sea wall;

a plurality of window or ball type one-way valves disposed side-by-side at several levels made on the face of said impact wall to serve as entrance for the surf water into the said tank for elevated water and trap same;

a control spring disposed in each valve to quickly return said valve on its seat;

a plurality of vertical drop water shaft disposed at even spacing along the horizontal length of, and thru the floor of, said tank of elevated water to serve as an exit of the elevated water;

a vertical water turbine disposed at the bottom section of each and every drop water shaft to be driven by the water exiting out thru said shaft;

an electric generator disposed just below the level of the roof of said floating sea wall and directly above each and every said water turbine;

a pipe drive shaft mechanically connecting each said water turbine to, and to drive, each said electric generator;

an automatic control switch and valve to shut down some of the drop water shafts when there is not enough elevated water to drive all the turbines when the water waves are low;

an electric voltage regulator for each generator;

a governor device in each drop water shaft to regulate the water turbines;

an electric power transmission line interconnecting all the electric generators to deliver the electric energy to the community, passing thru the roof-top guard rails;

said impact wall, its window valves, and other parts being made up of composite and sandwich construction of pressurized foam, honeycomb, hollow and fibrous durable materials to make it stiff and light;

section c: a power transfer means to convert the energy of the water waves into a concentrated mechanical force to drive push-and-pull machines, comprising:

a plurality of floating bundle of oscillator pipes disposed parallel to the water waves at an even spacing along the length of the said sea wall in front of the said impact wall, and set to be oscillated by the water waves;

said floating oscillator pipes being bundled in at least two pieces per bundle and long enough to drive two spacedly apart rocker arms;

a pressurized foam plastics injected to set inside said oscillator pipe to prevent water from getting into said pipes;

a foamed plastics sandwiched in between said bundle of oscillator pipes to form a horizontally flat rectangular cross-section of said floating oscillator with said pipes;

a vertical pipe push bar pivotally connected, thru a bearing plate connector, to each outer fourth points of said floating oscillator pipes to absorb the energy of same;

a horizontal control-drive bar, pivotally inter-connecting the bottom end of said vertical push bar and the front post of said impact wall, to prevent the said floating oscillator from getting near the impact wall;

a horizontal see-saw rocker arm pivotally attached to the top end of, and driven by, said vertical push bar;

a plurality of vertically fixed pipe posts spacedly attached to the outer face of said impact wall, the top of which pivotally holds the third point of, and act as fulcrum for, said rocker arm;

a weight attached to the downward end of said rocker arm to neutralize the weight of the moving parts at the left of the said fulcrum;

a wide faced continuous anti-oscillation resistor board horizontally disposed way down below all along the length of and suspended from said floating sea wall, by said vertical posts, at a depth where there is no expected oscillation of the water particles, to hold down said floating sea wall against the uplift force of the surf, thereby giving power to the rocker arm and more surf pressure upon said impact wall;

said resistor board being made up of composite and sandwich construction of pressurized foam, honeycomb, hollow pressurized pipes, and laminates of high tensile strength durable materials for its outer skin, including plastics and fiberglass, to make it stiff against bending stresses, and to be able to contribute buoyancy for the whole sea wall;

a plurality of upward one-way valves disposed all over said resistor board to allow fast upward passage of water thru said resistor board to make said floating sea wall easily drop down on the valley cycle of the surfs;

a plurality of vertical redundant pipe posts attached spacedly to and along the front and rear sides of said sea wall to take hold of the said resistor board and the floating sea wall together as one structure to act against up and down oscillation by the water waves;

a floater pipe, filled up with water and compressed air, disposed lengthwise under, and attached to the front edge of, said resistor board, the water content of which being automatically adjusted in accordance with the said impact wall's relationship with the undisturbed sea level 75, due to the varying weight of the elevated water that is being trapped by the impact wall;

a calibrated weight attached to, and under the rear edge of, said resistor board to serve as balancer to make said caissons stay at erect posture;

an apron wall attached to the rear vertical posts, extending down below said caisson wall and all along the length of the sea wall, to prevent spill thru of water waves under the sea wall and to increase surf pressure upon the impact wall;

an anchor sling rope, securely attached to said vertical posts, to hold the sea wall in place against the horizontal push and vertical uplift by the surfs upon said impact wall, and to increase surf pressure upon the impact wall;

section d: an underwater reverse osmosis machine being operated by the energy of the water waves disposed to produce desalinated sea water for community consumption; comprising:

a plurality of units of reverse osmosis chambers spacedly disposed, deep under water, beneath and along the length of said floating sea wall;

said chambers being in various forms of containers, including boxes, large cylindrical sections, and large continuous pipes, placed along and underneath said sea wall to form a multiple deepwell pumping station;

a plurality of membrane units in cylindrical frames systematically arranged and interconnected inside said deep water chambers, and disposed to function in a reverse osmosis process and to converge the desalinated water to a plurality of pumping stations;

a deepwell piston type force pump installed in each said pumping stations of said deep-water chambers to take out the desalted water from said deep-water chambers;

a vertical piston rod mechanically interconnecting said deepwell pump and said see-saw rocker arm to drive said deepwell pump;

a vertical pipe securely connected to the top of said deep water chamber to support same and to serve as conduit for the desalinated water, and which encloses the said piston rod;

said vertical conduit deepwell pipe being securely attached to the post that supports the said rocker arm to transmit buoyant force of the deepwell water chamber to said floating wall;

a vertical pipe line to supply sea water into said deepwell chamber for the reverse osmosis process, which is a downward extension of the support post of the antioscillation resistor board and the support post of the deepwell chamber, which has a connecting pipe link to the downward water shaft that supplies pressurized water to the water turbine;

an outlet with a regulator gate valve to allow exit of the concentrated brine and to flash out salt concentration on the outer surface of the reverse osmosis membranes;

a pipe line intercommunicating said deep well pump with the main line of desalinated water;

section e: a vacuum multichambered spray evaporator forced distillation machine, to desalinate sea water for community consumption and to produce concentrated brine, being operated by the energy of the water waves, comprising:

a plurality of vacuum evaporation chambers, in the form of horizontally disposed pipes that are arranged side-by-side to form a horizontal long and wide flat plain structure, strong enough to contain a vacuum against the atmospheric pressure, and preferably transparent to allow solar heat to get in easier, the bottom inside surface of which being painted flat black to prevent bouncing of the sunlight;

a float gate valve disposed in each chamber to regulate the entrance and maintain a designed level of sea water inside each chamber;

a plurality of spray nozzles disposed inside and all over the length of each said vacuum chambers, such that sea water enters the chambers in the form of mist spray;

a vacuum pipe line, intercommunicating said vacuum evaporator chamber to said vacuum pump, to take the water vapor out of said vacuum evaporation chamber;

a multistage piston vacuum pump, to take out the water vapor from said vacuum chambers thru said vacuum pipe line and to compress said vapor in order to condense said vapor;

said vacuum pump being mechanically connect to and driven by said horizontal rocker arm drive bar;

a plurality of high pressure condensation pipe chambers disposed inside said evaporation chambers to convert the desalted vapor from said vacuum pump into liquid, said condensation pipe also serve as conduit of the desalinated water from the said under water deep well reverse osmosis chamber to enhance condensation of said vapor; and to deliver the desalted water to the community;

a high pressure pipe line intercommunicating said multistage vacuum pump with the plurality of said condensation chambers;

a plurality of auxiliary or stand by multistage vacuum pumps that are driven by electricity or engines to augment the pumping rate of said water-wave driven vacuum pump, when the water waves are small;

a plurality high suction piston force pump, driven by the water waves thru said floating oscillator, intercommunicated with said vacuum evaporation chamber thru a plurality of suction pipes, to expel the concentrated brine out from each said vacuum evaporation chambers;

a plurality of auxiliary or stand by suction force pumps, driven by electricity or engines, to help expel the brine out from said evaporation chambers;

a main water pipe line to collect all the desalted water from the said reverse osmosis apparatus, and from the said distillation apparatus, and to deliver said water to the community;

a tie rope interconnecting said floating sea wall and said evaporation apparatus to prevent said structures from drifting away from each other;

a rubber bumper disposed in, between said sea wall and said evaporator to prevent wear and tear between said apparatus;

section f: a solar trap device that allows the sunlight to pass thru but prevents heat transfer back to the atmosphere, in the form of multilayer transparent composite, either plastic or glass, having air or vacuum in between sheets to prevent wind contact on said evaporator chambers, comprising:

at least one or two transparent sheets having air space in between, that are durable under sunlight conditions, disposed to cover the upper surface of said vacuum evaporators to serve as blanket against the free air or wind, in order to conserve the heat energy brought in by the sunlight;

a plurality of thermal insulator blocks disposed to separate said blanket sheet from the surface of said evaporator chamber;

said solar trap sheets being in various forms, including, flexible air bubble sheets, air bubble roofs, and vacuum sandwiches;

said vacuum sandwiches being in the form of multilayer rigid sheets, having transparent thermal insulator spacer blocks in between to create space in between sheets, said space being sucked out to make it into a vacuum space, in order to increase the heat insulating power of said solar trap;

said thermal insulator spacer blocks being in the form of pressurized transparent bottles to cut cost;

said transparent composites being made up of at least two layers of different composites, such that the lower layer composite has a vacuum in between the sheets, while the upper layer composite has compressed air in between sheets, in order that the upper face will become strong enough to serve for various purposes, including, a clean and safe recreational playground for roller skates, land sail boats, landing field for light aircrafts, and to serve as pavement for light vehicles;

section g: a plurality of push-and-pull electric generator that is made up of a thin, long and wide, rectangular plate assembly of magnets that moves up-and-down or back-and-forth inside a correspondingly wide and long box defined by a coil of conductor wires as stator, said magnets being mechanically connected to and being driven by each said rocker arm drive bar, to produce electric power supply out of the water wave energy, comprising:

a coil of electric conductor wires, systematically wound to create a hollow thin rectangular box stationarily attached and disposed vertically to the upper side of said floating caisson wall that is facing away from the surfs;

an assembly of a plurality of bar magnets bundled together to form a thin, long and wide, solid rectangular plate that fits in and moves back-and-forth or up-and-down inside said hollow rectangular wire coil box, said magnet assembly being mechanically connected to, and driven by, said rocker arm drive bar;

a transistorized commutator at the terminals of said coil of conductors to convert the electric power produced by the movements of said magnets into direct current;

a motorized or vibratory switch, a capacitor, a voltage regulator, and a transformer for each generator to convert said direct current electric power into alternating current at a voltage and frequency required by the community power grid;

a main conductor wire to connect the electric power out put of each said push-and-pull electric generator to the main power grid, and;

a control bearing channel to guide said magnet assembly into the hollow box of said stator coil.

2. A floating sea wall in accordance with claim 1, wherein, for the same purpose of using said multichambered hollow honeycomb wall, said anti-oscillation resistor board, said multiwindow impact wall, and said underwater apron wall, all assembled to act as one unit piece of machine and formed into a new simple sea wall, to convert the energy of the water waves into compressed air and electricity, said sea wall being disposed floating on the open waters to stop the surfs totally, comprising:

a plurality of equal length sections of said multiwindow trap impact wall vertically dispose facing the water waves and arranged end to end to from a long straight line, in accordance with section b of claim 1;

a floater caisson in accordance with section a of claim 1, vertically disposed to serve as floating post at every end and between said sections of hollow floating wall;

a composite floatable wall section of same length vertically disposed behind said impact wall to from a space between said two walls;

a horizontal wall interconnecting the top of said impact wall and rear walls to serve as roof and roadway, and to form an open bottom large chamber section of the floating sea wall;

a plurality of vertical subdivision walls perpendicular to and spacedly interconnecting said impact wall to the rear wall to form a plurality of smaller vertical chambers in each said sections of the floating sea wall;

at least one upwardly concave horizontal subdivision walls disposed to create a lower and upper compression chambers in each said smaller vertical chambers, the lowest chamber being open bottom;

said horizontal subdivision walls having a plurality of large and small holes, the center holes being the largest;

a plurality of upwardly one-way valves disposed on each said holes of said horizontal subdivision walls to enable said compression chambers to retain compressed air;

said one-way valves being preferably in the form of float ball valves that sit on said holes in order to float and release the water when oversized surfs enter the upper chambers;

a plurality of holes at the upper most vertical subdivision walls being provided to intercommunicate all the upper most chambers all the way along said floating sea wall;

a cage surrounding each said float ball one-way valve to keep said ball near its seat;

at least one horizontal surf suppressor wall provided and attached to the impact wall at even levels extending outward from the face of said impact wall to stop the surfs splashing over the sea wall;

at least two inward valves being provided at the lower section of said backwall for air entrance to each lowest compression chamber;

a rail guard on each side of the roof top of the floating sea wall;

an apron wall being provided as a downward extension of said rear wall to prevent spill thru of water waves under the sea wall and to increase power of the water piston being rammed into the compression chambers;

an anti-oscillation resistor board, of same length as the floating sea wall, securely attached to the bottom end of said apron wall, and horizontally disposed to have wider face directly below the compression chambers, to prevent the sea wall being lifted up by the surf and to effect ram force by the surfs;

a plurality of redundant struts interconnecting the apron wall and the impact wall to said resistor board to make said board rigidly horizontal;

a plurality of sling anchor rope spacedly attached to the face of the impact wall and along the length of said sea wall to hold said wall stationary and upright and to effect more pressure of surfs upon the impact wall;

an anchor black on the ocean floor made of heavy rock sausages disposed at the lower end of each said anchor rope;

a plurality of air turbine disposed at the upper part of the said rear wall to serve as an outlet of the compressed air and to serve as prime driving machine, spacedly installed all along the length of said sea wall;

an electric DC generator mechanically connected to and being driven by each said air turbines, and being provided with DC-AC converter and transformer, to synchronize the power output with the utility grid;

a pair of negative and positive electric conductor lines disposed under said roof of the sea wall to collect electric power from each generator and to deliver the electric power to the community;

an air pressure controlled switch, to shut down some of the turbines when the air pressure is low, being provided on each said turbines;

a plurality of upwardly one-way valves provided on the said anti-oscillation resistor board to make said sea wall drop down on the valley cycles of the water waves;

a plurality of restraining rope disposed slantly interconnecting the vertical midpoint of the Apron Wall and the front bottom edge of the vertical subdivision wall;

a plurality of floater oscillator pipes, for the same purpose of using said floating bundle of oscillator pipes and said horizontal control bar acting as drive bar, being joined together to form a power transf mechanism in accordance with section c of claim 1, disposed to be oscillated by the water waves at the front of said impact wall;

said oscillator pipes being made up of at least two of either empty, pressurized, or styrofoam filled pipes bundled together horizontally side-by-side to form a one unit elongated floater disposed parallel to said sea wall, the cross-section of which being a flat rectangle to maximize buoyancy by the first one-fourth length of the water waves;

said horizontal drive bar having its rear end pivotally connected to the front face of said impact wall of the floating sea wall, while its front end being pivotally connected to the top center of said horizontal bar frame clip of said bundle of floater oscillator pipes;

a horizontal bar frame to serve as clip on top of said oscillator pipes to press flat same and to hold a U-bar Clamp that goes around under said oscillator pipes;

a ballast calibrated weight that is placed inside said floater-oscillator pipes, which is in the form of water inside a smaller pipe, to enable said floater oscillator pipe to drop down on the valley of the water waves in order to drive a piston-type pump that is disposed below or under said oscillator pipe;

said bar clips being attached to the fourth points of said oscillator pipes so that there will be two drive bars being oscillated by one unit of a floater oscillator;

said horizontal drive bars being connected to the face of said impact wall of the floating sea wall by means of a vertical post at an elevation such that said drive bar will be in a horizontal posture when said oscillator pipe is floating on the undisturbed or mean water level of the ocean;

said post extends from the bottom lip of said impact wall and up to one drive-bar length above the pivot connection of said drive bar upon said impact wall;

a piston-type pump disposed to be driven by said drive bar, the piston rod of which being pivotally connected to the bottom of, and at ¾ point of, said drive bar, while the rear end of the chamber of said pump being pivotally connected to said vertical connector post at a point below said drive bar such that the whole said pump will be at least 45 degrees on a slant posture;

a piston-type pump or a push-and-pull type electric generator, as described in section g of claim 1, disposed to be driven by said drive bar and mechanically connected to, and above, said horizontal drive bar in the same manner of connection as said pump below said drive bar;

said vertical connector post being adjustably movable up and down for safe operation in accordance with the varying sizes of the surfs, and a set of corresponding water hoses, or compressed air pipes, or electric conductor wires, to correspondingly collect and deliver the energies produced by said pumps, electric generators, and compressors, to the consumers.

3. A floating hollow structure in accordance with claim 1, wherein, for the same purpose of using said multichambered hollow honeycomb structure as a dwelling place or residential house, said floating structure is in the form of an apartment building or in the form of single or cluster of residential houses set floating on the newly created harbor behind said floating sea wall, said cluster being held together by rigid connectors to form a structure acting as one rigid unit, a plurality of anti-oscillation resistor board being provided to said structure, and said structure being anchored to serve as community dwelling place or office out on the ocean.

4. The hollow honeycomb multichambered elongated structure of claim 1 including a new design in the construction of a push-and-pull electric generator, wherein, for the same purpose of using said thin plate rectangular magnet as armature in an electric generator, said plate magnet is constructed into a pipe, and likewise, said induction wires are coild to form another pipe of less diameter and another induction pipe of larger diameter than said pipe magnet that is then inserted and driven back-and-forth in between said smaller and larger induction pipes to generate electricity, and wherein, a plurality of various sizes of said magnet pipe and said induction pipe are alternately arranged to form a multilayer cylindrical electric generator that is driven rotationally and/or push-and-pull, or said magnet being rotated opposite against the rotation of said induction pipe for more power.

5. The hollow honeycomb multichambered elongated structure of claim 1 including a new design for a solar trap, wherein, said vacuum evaporation chamber, and other devices being heated by sunlight, are painted with flat black, sprayed with powdered charcoal, and prayed with black magnetite sand, in order to prevent reflection of sunlight.

6. The hollow honeycomb multichambered elongated structure of claim 1 or claim 2, including a new design of underwater apron wall, wherein, said apron wall is monolithically attached to, and made to serve as downward extension of, the outer siddings of said floating buildings and to serve as underwater outer skirts of said floating buildings, said apron wall being made strong against flexural stresses by compositely constructing it out of light and fibrous materials, including pressurized pipes, fiberglass, reinforced plastics, and stainless steel.

7. The hollow honeycomb multichambered elongated structure of claim 1 including a new design for a light structural member to be used underwater and over the dry land, wherein, said pressurized pipe is made up out of any strong material, filled up with compressed air, light gas, and/or pressurized foamed plastics, said light structural members being used for various constructions, including underwater footings for floating buildings, for bridges, for superstructures, for stiffeners, for structural girders, for floating devices, and for structural balloons or flying structures.

8. The hollow honeycomb multichambered elongated structure of claim 1 or claim 2 including a new design for a water-wave floater oscillator, wherein, a plurality of pressurized pipes are bundled side-by-side to act as one unit having a cross-section in the form of a horizontal flat rectangle, the spaces in between said pipes being filled up with smaller pressurized floater pipes, the smaller spaces in between said various sizes of pipes being filled up with foamed plastics, to maximize buoyant power of said unit of floater oscillator, a straight bar being provided across on the top ¼ points of said bundle of pipes to hold said pipes in a horizontal flat formation by means of a U-bar clip under said pipes to bundle same together, said plastic foams and pipes being enclosed together by means of a laminate of fibers and plastics serving as a wrap around outer skin of said one unit of floater oscillator, said oscillator being used as a prime mover to activate any push-and-pull or purely pull machine by connecting said driven machines to said top cross bar clip of said floater oscillator.

9. A new design for a floating sea wall, in accordance with claim 1 or claim 2, wherein, for the same purpose of using said multi-chambered hollow honeycomb wall, said honeycombs are in the form of various shapes of large structural sections of building blocks with interlocking connectors, said blocks serving as aggregate parts to form various geometrical clusters of buildings that float on the ocean, said blocks being made of monolithic fiber-reinforced composites, laminates, and sandwiches of light hollow materials.

10. A new design for a floating sea wall, in accordance with claim 1 or claim 2, wherein, for the same purpose of using said multi-chambered hollow honeycomb wall, said wall encloses a wide safe refuge area on the ocean, and wherein, said enclosure is being transferred from place to place by means of various power devices, including kites, sails, and engines.

11. The hollow honeycomb multichambered elongated structure of claim 1 including a new design for a push-and-pull electric generator, wherein, for the same purpose of using said push-and-pull electric generator, said generator is set to be driven by various types of power devices, and wherein, said plate magnet armature is in the form of a cluster of a plurality of parallel plate magnets held by one structural arm so that all said magnets move at the same time in one direction, back-and-forth in a correspondingly spaced plurality of wire coil parallel boxes, one said box being for one plate magnet, said box being three times longer than said plate magnet, and said wires being coild perpendicular to the movements of said magnet.

12. The hollow honeycomb multichambered elongated structure of claim 1 including a new design for a distillation apparatus, wherein, for the same purpose of using said vacuum chamber and said mist spray evaporation process, said apparatus is set to be driven by various kinds of power devices, comprising:

a plurality of vacuum chambers;

a plurality of spray nozzles attached to the inside walls of said vacuum chambers;

said nozzles supply said chambers with the liquid in the form of fine mist spray;

a vacuum pump connected by suction pipe to one end of each said chambers to suck out vapor from said chambers and to compress said vapor into the condensation pipe;

a check valve installed in the suction pipe to prevent backflow of vapor into the vacuum chamber;

a pipe line connected to the top of each said chambers intercommunicating all said chambers;

a condensation pipe connected to the outlet of each said pump to collect the vapor at a high pressure;

a pipe line connected to each said nozzles to supply liquid thru said nuzzles into said evaporation chamber;

a pipe line connected to the bottom of each said chambers intercommunicating all said chambers;

a force pump connected to said bottom pipe line to take out the waste concentrated liquid collected on the floor of each said chambers;

a main pipe line interconnecting all said condensation pipes to collect all the condensates;

said condensation pipes being installed inside said vacuum evaporation chamber for cooling and to supply heat into said chambers;

a heating system of any type being adapted to supply heat into said evaporation chamber;

a compressed air supply pipeline connected to each said nozzle to help atomize the liquid being distilled; and a recycle pipeline connecting said force pump to said nozzle to make the unevaporated liquid re-enter said chamber.

13. The hollow honeycomb multichambered elongated structure of claim 1 including a new design for a solar trap, wherein, for the same purpose of using said multi-layer space sandwiches to trap solar-energy, said solar trap is in various forms, including, a transparent pavement, a dome or inclined roof, multilayer boxes, pipes, and spheres, in order to build structures that absorb solar heat for various purposes or to enclosed an element or parts being heated by the sunlight, said solar trap being in the form of multilayer spacedly parallel or concentric transparent plates/sheets with spaces in between sheets, said spaces containing compressed air or air bubbles to support said sheets, or said spaces being vacuumized to minimize heat conductivity of said solar trap.

14. The hollow honeycomb multichambered elongated structure of claim 1 including a new design for a distillation apparatus, wherein, said evaporation chamber is in the form of a water pond under sunlight covered by spacedly parallel roof panels that are made up of said solar trap or transparent heat insulators, and a high thermal conductivity transparent roof material is placed in each space between said solar trap panels to create a cold roof surface in contact with the wind that will condense the vapor at the lower surface of said cold roof, and a collection gutter is being disposed on slope to collect the condensed vapor dropping down from said cold roof.

15. The hollow honeycomb multichambered elongated structure of claim 1 including a new design for a thin plate electric generator, wherein, said magnets and induction wire plates are in the form of a circular disk, wherein, said disks are driven to spin oppositely against each other in order to double the relative speed of the electric generator, and wherein, the induction wire disks are spacedly held by a central drive shaft that rotates clockwise while the magnet disks, each having large hole on center, are disposed in between said wire disks by attaching said magnets to an outer large cylindrical drive shaft that serves as an outer shell of the electric generator, and said outer drive shaft is being driven to rotate counterclockwise.

16. The hollow honeycomb multichambered elongated structure of claim 1 including a new process of distillation, that has been newly created and used in claim 1, wherein, the liquid that is being distilled is being converted first into the form of fine mist spray in order to create a large liquid surface that is exposed to the atmosphere in order to speed up evaporation of the molecules, and wherein, said mist/vapor is being passed thru a plurality of spacedly vertical parallel cold plates that are enclosed in a chamber to condense said vapor, and a gutter being provided and disposed under each said cold plate to serve as collector for the condensate.

17. The hollow honeycomb multichambered elongated structure of claim 1 including an anti-oscillation resistor board in the form of a wide faced rigid board that has strong resistance against flexural stress, having a flat top face with upwardly one way window valves to allow water to pass upward thru said windows during the valley cycles of the water waves, said wide board being disposed horizontally well below the water surface where there is no movement of the water due to the water waves, said board being provided with redundant posts spacedly interconnecting said board with any floating object or structure desired not to be oscillated by the water waves.

18. The hollow honeycomb multichambered elongated structure of claim 1 including a new design for a rigid and stiff flat structure, wherein, said structure is a composite multilayer laminate of pressurized pipes containing compressed air or pressurized plastic foam, said pipes being bundled together by fiber reinforced plastics and by other durable structural fasteners and enclosures, one use of said flat structure being a floating airport.

19. The hollow honeycomb multichambered elongated structure of claim 1 including a new design for a water wave driven pumping station, wherein, for the same purpose of using said steady wide face anti-oscillation board and said flat bundled pipe floating oscillator, said parts are interconnected and paired together by a vertical redundant post that pierce said oscillator thru a center hole, said post being mechanically attached to a water pump disposed under and attached to said oscillator, while the upper end of said post, above said oscillator, being mechanically connected to another air pump that is disposed above and attached to said oscillator, and wherein, a plurality of this apparatus is constructed to form a long line pumping stations.

20. The hollow honeycomb multichambered elongated structure of claim 1 or claim 19 including a new design for an anti-oscillation board, wherein, for the same purpose of using said anti-oscillation board and said floating oscillator as partners in energy production, said wide face board is built to be elastic and resilient to act and perform like the big caudal tail of a large whale, said board being firmly and squarely attached to a redundant vertical post that is likewise firmly and squarely attached to said floating oscillator in order to move said oscillator forward when the water waves oscillates said apparatus, said oscillator being in the form a boat and said post pierces said boat so that said wide board is adjustable to touch the bottom of the boat when landing on shallow waters.

* * * * *